(No Model.)

F. R. SMITH.
FISHERMEN'S REEL.

No. 244,828.                        Patented July 26, 1881.

WITNESSES:
C. Bendixon
Chas. C. Raymond

INVENTOR:
Franklin R. Smith
Per Duell, Laass & Hey
attys

UNITED STATES PATENT OFFICE.

FRANKLIN R. SMITH, OF SYRACUSE, ASSIGNOR OF ONE-HALF TO WILLIS S. BARNUM, OF ONONDAGA COUNTY, NEW YORK.

FISHERMAN'S REEL.

SPECIFICATION forming part of Letters Patent No. 244,828, dated July 26, 1881.

Application filed April 5, 1881. (No model.)

*To all whom it may concern:*

Be it known that I, FRANKLIN R. SMITH, of Syracuse, in the county of Onondaga, in the State of New York, have invented new and useful Improvements in Fishermen's Reels, of which the following, taken in connection with the accompanying drawings, is a full, clear, and exact description.

This invention relates to an improved automatic reel, designed to be used on a fishing rod or pole, for the purpose of winding up the fishing-line.

The invention consists in certain peculiarities in the construction and combination of the component parts of the apparatus, whereby the same is rendered simple and comparatively inexpensive in construction, and convenient and effective in operation, all as hereinafter more fully described, and specifically set forth in the claims.

Figure 1:
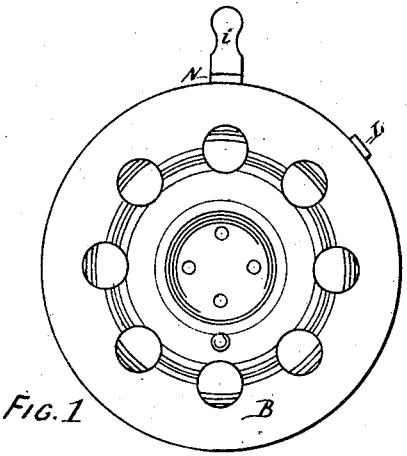
Figure 2:
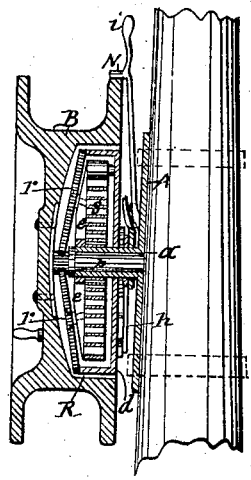
Figure 3:
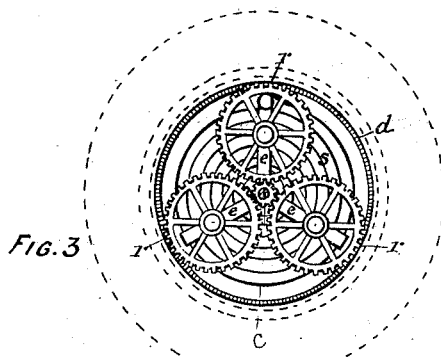
Figure 4:
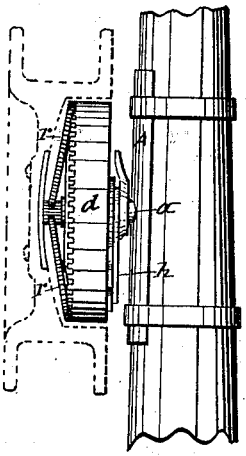
Figures 5, 6:
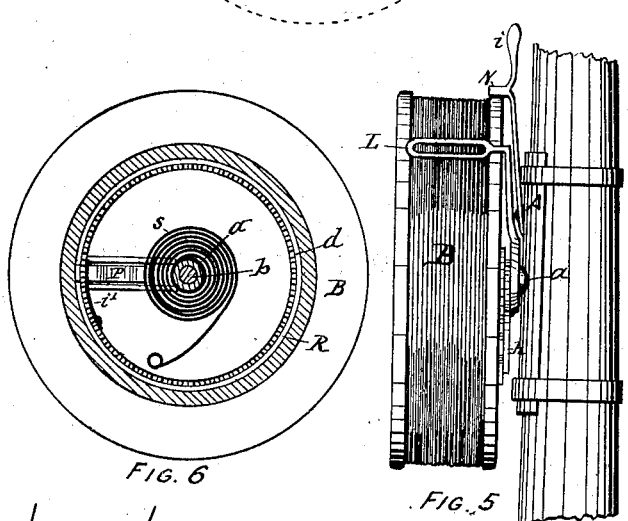
Figure 7:
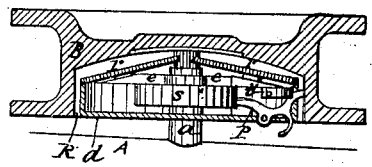

In the accompanying drawings, Figure 1 is a front view of the reel. Fig. 2 is a vertical transverse section of same. Fig. 3 is a front view with the spool removed, affording a face view of the actuating mechanism. Fig. 4 is a side view of the same. Fig. 5 is an exterior side view of the reel. Figs. 6 and 7 are plan and side views, respectively, of the stop designed to prevent excessive strain on the actuating mechanism of the wheel incident to undue draft on the line.

Similar letters of reference indicate corresponding parts.

A represents a plate adapted to be secured to a fishing-rod, and having projecting from its outer face a rigid tubular stud or post, $a$.

B denotes the spool upon which the fishing-line is wound. Said spool is provided in its rear with a concentric cavity or recess, R, from the centre of which projects a rigid pintle, $b$, by means of which the spool is pivoted in the tubular post $a$ and connected therewith.

$d$ is a spur-wheel in the form of a circular disk, having projecting from one of its sides a concentric annular flange or rim, which is cogged or toothed at its free edge. Said spur-wheel is mounted loosely on the post $a$, and in such relative position as to bring the circular disk nearly or quite flush with the rear edge of the spool and the cogged rim of said wheel inside of the cavity R. Within the said cavity thus closed by the spur-wheel $d$ are arranged the remainder of the actuating mechanism, consisting of the coil-spring $s$, located nearest the disk of the spur-wheel $d$, and secured at one end to the post $a$ and at the opposite end to the inner periphery or rim of the spur-wheel. The latter is thus made to serve as a case for the spring $s$. Next to said spring are radial arms $e\ e\ e$, fixed stationary on the post $a$, which arms serve to sustain the spring laterally in its described case. Upon these stationary arms are pivoted gears $r\ r\ r$, which mesh in the cogged rim of the spur-wheel $d$ and in a pinion, $c$, fixed to the spool B or its pintle $b$, and thus transmit motion from said spur-wheel direct to the spool.

By employing three or more arms, $e\ e\ e$, equidistantly apart, and a corresponding number of intermediate gears, $r\ r\ r$, as shown in Fig. 3 of the drawings, the vibrations of the reel are prevented and the strain is distributed and equalized, thus admitting of the use of light gearings, which may be cut or stamped out of sheet metal, and consequently reduce the cost of manufacture.

It will be observed that by the described arrangement of the actuating mechanism in the cavity in the side of the spool the reel is rendered compact and brought near the rod, and also affords ready access to said mechanism for repairs when required.

$h$ represents the so-called "click," usually applied to ordinary reels as an alarm, indicating by its sound the movement of the spool incident to a draft upon the line by a fish caught thereon, said click consisting of a serrated disk fixed to the back of the spur-wheel, and a dog pivoted to a stationary arm on the post $a$, and held in contact with said disk by a spring, which allows the dog to be thrown out of connection with the disk when desired.

L denotes a line-guide, in the form of an arm loosely connected to the post $a$ between the before-described click and attaching-plate A, and terminating with a loop or eye extended across the peripheral face of the spool, as best seen in Fig. 5 of the drawings. In order to obtain the requisite rigidity for the said line-guide, and to also simplify and cheapen the construction thereof, I stamp the same out of sheet metal, giving it the necessary breadth to stiffen it, and punching in the projecting free end the aperture for the reception of the line to be guided.

N represents a brake, designed to check the movement of the spool B and prevent it from drawing in the line when thrown out in the act of fishing, said brake consisting of a spring-plate secured to the attaching-plate A back of the spool, and having an offset engaging the periphery of the spool, as shown in the drawings. A handle, $i$, projecting from the end of the said brake, allows the fisherman to throw the brake off the spool, and by liberating the said spool cause the same to automatically wind up the fishing-line when desired.

In drawing out the fishing-line preparatory to throwing the same in the act of fishing, the spool B is caused to wind up the spring $s$, the brake or friction-clutch N checking the reverse movement of the spool and preventing the same from drawing in the line until liberated from the brake by the hand of the operator.

In order to guard against excessive strain on the spring and on the gears transmitting the power of said spring to the spool, I employ a stop, P, pivoted to the spur-wheel or spring-case $d$, and having its inner or rear end of proper length to bear against the periphery of the spring when wound nearly or quite up to its maximum tension, as illustrated in Figs. 6 and 7 of the drawings.

A light spring, $i'$, pressing against the rear of the dog or stop P, throws the same into the aforesaid position in relation to the spring. Simultaneously with the engagement of the rear end of the stop with the spring $s$ the outer end of said stop is forced outward and caused to engage the spool B, thereby preventing further rotation of the latter incident to undue draft upon the line. A suitable handle, connected to the stop P and protruding through the spring-case, allows the operator to throw the stop out of its before-described engagement with the spring $s$ when desired to utilize the tension thereof for winding up the line.

It is obvious that a sliding stop will produce the same effect as a hinged or pivoted stop, and I therefore do not confine myself to any specific construction of the same, the chief object being to cause the stop to be actuated by the spring when at its maximum tension, and to automatically engage the spool and prevent further rotation of same at that time.

Having thus described my invention, what I claim as new, and desire to secure by Letters Patent, is—

1. An automatic fisherman's reel, actuated by a spring-restrained main gear concentric with the line-spool and mounted loose on a stud fixed to the rod, a pinion fixed to the spool, and intermediate gears pivoted at points held stationary in relation to the rod and midway between the geared peripheries of the main gear and pinion aforesaid, substantially as described.

2. An automatic fisherman's reel composed of a tubular main stud or post adapted to be affixed to a fishing-rod, a spool having a rigid pintle journaled in said post, a pinion fixed to the spool or its pintle, a spur-wheel mounted loose on the post, a coil-spring connected with the spur-wheel and post respectively, an arm extended rigidly from said post, and an intermediate gear pivoted to said arm and engaging directly with both the aforesaid spur-wheel and pinion, substantially as described and shown.

3. In a fisherman's reel, the combination of a line-spool provided in its side with a concentric recess, a combined actuating-gear and spring-case consisting of a circular disk nearly or quite flush with the rear edge of the spool, and having projecting from its periphery into the cavity of the spool a concentric rim or flange, cogged or toothed at its free edge and engaging with gears transmitting motion to the spool, and a coil-spring inclosed by and arranged to actuate aforesaid combined gear and case, all constructed and combined substantially in the manner shown and set forth.

4. In combination with the pivoted spool B, provided with the cavity R, and pinion $c$, the combined spring-case and actuating-gear $d$, having on its side a toothed concentric rim, and the coil-spring $s$, located in the said spring-case, the combined guards and equalizers $e\ e\ e$, fixed to and radiating from the post $a$, and the intermediate gears, $r\ r\ r$, pivoted on said equalizers, all combined, arranged, and operating substantially as specified and shown.

5. In combination with the spool B, the brake N, consisting of a spring-plate secured to the attaching-plate A, and having an offset or shoulder in proximity to the periphery of the spool, and a handle, $i$, at its extremity, substantially as described and shown.

6. The combination, with a pivoted spool actuated by a spring, of a stop arranged to be operated by said spring when at or near its maximum tension, and thrown thereby in contact with the spool, for the purpose of checking the movement thereof, substantially as set forth.

In testimony whereof I have hereunto signed my name and affixed my seal, in the presence of two attesting witnesses, at Syracuse, in the county of Onondaga, in the State of New York, this 30th day of March, 1881.

FRANKLIN R. SMITH. [L. S.]

Witnesses:
WILLIS S. BARNUM,
WM. C. RAYMOND.